(12) United States Patent
Lee et al.

(10) Patent No.: US 7,556,876 B2
(45) Date of Patent: Jul. 7, 2009

(54) POLYBENZIMIDAZOLE-BENZAMIDE COPOLYMER, PROCESS FOR PREPARING THE SAME, ELECTROLYTE MEMBRANE PREPARED THEREFROM AND PROCESS FOR PREPARING THE SAME

(75) Inventors: Jong-chan Lee, Seoul (KR); Yong-su Park, Bucheon-si (KR); Tae-ho Kim, Seoul (KR); Bong-keun Lee, Daejeon (KR); Chong-kyu Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 714 days.

(21) Appl. No.: 11/280,228

(22) Filed: Nov. 17, 2005

(65) Prior Publication Data

US 2006/0068259 A1 Mar. 30, 2006

(30) Foreign Application Priority Data

Dec. 7, 2004 (KR) ...................... 10-2004-0102397

(51) Int. Cl.
*H01M 8/10* (2006.01)
*C08J 5/20* (2006.01)
*C08G 73/18* (2006.01)

(52) U.S. Cl. ........................... 429/33; 521/27; 528/331; 525/420

(58) Field of Classification Search .................... 429/12
See application file for complete search history.

(56) References Cited

U.S. PATENT DOCUMENTS 3,951,920 A * 4/1976 Senoo et al. ................ 210/654
6,362,291 B1 * 3/2002 Shimizu et al. .............. 526/74

2003/0001143 A1 * 1/2003 Akita et al. ................. 252/500

OTHER PUBLICATIONS

Asenio, et al. "Proton-Conducting Polymers Based on Benzimidazoles and Sulfonated Benzimidazoles" Journal of Polymer Science: Part A: Polymer Chemistry, vol. 40, 3703-3710 (2002).

(Continued)

*Primary Examiner*—Jonathan Crepeau
*Assistant Examiner*—Amanda Barrow
(74) *Attorney, Agent, or Firm*—McKenna Long & Aldridge LLP

(57) ABSTRACT

The present invention relates to a novel polybenzimidazole-benzamide copolymer composed of the repeating units represented by formula 1 which is applicable to the electrolyte membrane of fuel cell and a preparation method of the same. The present invention also relates to an electrolyte membrane produced from the above copolymer of the invention and a preparation method thereof. The present invention further relates to a membrane-electrode unit for fuel cell containing the electrolyte membrane of the invention and a fuel cell system including the unit. The electrolyte membrane prepared by the polybenzimidazole-benzamide copolymer of the invention has improved proton conductivity, compared with the conventional polybenzimidazole polymer membrane, and has thermal and chemical stability in addition to the operating capacity in a wide temperature range.

[Formula 1]

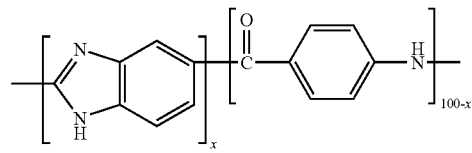

Wherein, x is 0.1~99.9.

8 Claims, 2 Drawing Sheets

OTHER PUBLICATIONS

Li, et al. "Water Uptake and Acid Doping of Polybenzimidazoles as Electrolyte Membranes for Fuel Cells" Solid State Ionics 168 (2004) 177-185.

Wainright, et al. "Acid Doped Polybenzimidazoles: A New Polymer Electrolyte" J. Electrochem. Soc., vol. 142, No. 7, Jul. 1995.

Li, et al. "Approaches and Recent Development of Polymer Electrolyte Membranes for Fuel Cells Operating Above 100° C" 2003 American Chemical Society.

Arsenio, et al. "Polymer Electrolyte Fuel Cells Based on Phosphoric Acid-Impregnated Poly (2,5-benzimidazole) Membranes" Journal of Electrochemical Society, 151 (2) A304-A310 (2004).

Kim, et al. "Synthesis of Poly (2, 5-benzimidazole) for Use as a Fuel-Cell Membrane" Macromol. Rapid Commun. 2004, 25, 894-897.

* cited by examiner

POLYBENZIMIDAZOLE-BENZAMIDE COPOLYMER, PROCESS FOR PREPARING THE SAME, ELECTROLYTE MEMBRANE PREPARED THEREFROM AND PROCESS FOR PREPARING THE SAME

This application claims the benefit of the filing date of Korean Patent Application No. 10-2004-0102397, filed on Dec. 7, 2004 in the Korean Intellectual Property Office, the disclosure of which is incorporated herein in its entirety by reference.

TECHNICAL FIELD

The present invention relates to a novel polybenzimidazole-benzamide copolymer composed of the repeating units represented by the following formula 1, which is applied to the electrolyte membrane of a fuel cell, and a preparation method of the same. The present invention also relates to an electrolyte membrane produced by using the mentioned copolymer and a preparation method thereof. The present invention further relates to a membrane-electrode unit (MEA) for fuel cell containing the above electrolyte membrane and a fuel cell system including the same.

[Formula 1]

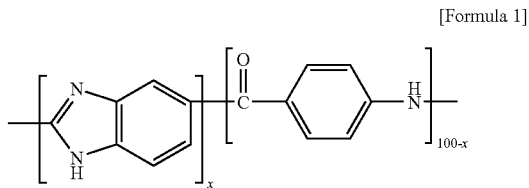

Wherein, x is 0.1~99.9.

BACKGROUND ART

A fuel cell has an electrolyte and a pair of electrodes separated by the electrolyte. In inside of a fuel cell, a fuel like hydrogen is supplied to one of the two electrodes and an oxidant like oxygen is supplied to the other electrode, suggesting that chemical energy including oxidation of a fuel is converted into electric energy. Hydrogen ion (that is, proton) can pass through the electrolyte but reactant gases (that is, hydrogen and oxygen) cannot. In general, laminated fuel cell contains numbers of fuel cells and each of the fuel cell has one electrolyte and a pair of electrodes separated by the electrolyte.

Fuel cells are classified into solid oxide electrolyte fuel cell, molten carbonate fuel cell, phosphoric acid fuel cell and polymer electrolyte membrane fuel cell, according to the electrolyte included in them. Polymer electrolyte membrane fuel cell contains polymer electrolyte membrane as its electrolyte, and thus, has high energy density and efficiency as well as other advantages such as fast starting and stop owing to its low operating temperature.

In order to be used for a fuel cell, an electrolyte has to have high proton conductivity, low methanol permeability and stability on operating temperature. In the case of Nafion polymer electrolyte membrane, provided by Du Pont, USA, it cannot be commonly used because of high unit price and low thermal stability, although it has excellent mechanical and chemical stability and high proton conductivity. Thus, studies have been vigorously undertaking to overcome the above barriers to produce a polymer electrolyte membrane.

As of today, the studies have been directed to develop a hydrocarbon polymer or a fluoride/hydrocarbon mixed polymer electrolyte membrane, rather than a fluoride polymer electrolyte membrane (Li, et al., Chemistry of materials, ACS, 2003, 15, 4896-4915).

One of the most representative hydrocarbon polymer electrolyte membranes was produced by doping phosphoric acid ($H_3PO_4$) into an alkali polymer polybenzimidazole, which has very low fuel permeability, moderate electrolyte price, excellent mechanical properties, oxidation resistance and thermal stability (Wainwright, et al., Journal of the Electrochemical Society, ECS, 1995, 142, L121; Li, et al., Solid State Ionics, Elsevier, 2004, 168, 177-185; Asensio, et al., Journal of Polymer Science, 2002, 40, 3703-3710; Asensio, et al., Journal of the Electrochemical Society, ECS, 2004, 151, A304-A310; Kim, et al., Macromolecular Rapid Communications, Wiley, 2004, 25, 894-897).

Nevertheless, the polybenzimidazole polymer electrolyte membrane prepared by doping phosphoric acid has inappropriate proton conductivity, not sufficient enough to replace Nafion.

DISCLOSURE OF THE INVENTION

In order to overcome the above mentioned problems, the present inventors have studied and completed this invention by confirming that a polymer electrolyte membrane produced by using a novel polybezimidazole-benzamide copolymer composed of the repeating units represented by formula 1 has similar to or higher proton conductivity than the conventional polybezimidazole polymer electrolyte membrane.

Therefore, it is an object of the present invention to provide a polybenzimidazole-benzamide copolymer composed of the repeating units represented by formula 1 applicable to the electrolyte membrane of a fuel cell and a preparation method of the same.

It is another object of the present invention to provide a polymer electrolyte membrane characteristically prepared by using the polybenzimidazole-benzamide copolymer of the invention and a preparation method thereof.

It is a further object of the present invention to provide a membrane-electrode unit for fuel cell containing the polymer electrolyte membrane of the invention and a fuel cell system including the same.

Hereinafter, the present invention is described in detail.

The present invention relates to a polybenzimidazole-benzamide copolymer characteristically composed of the repeating units represented by formula 1 and a preparation method of the same.

[Formula 1]

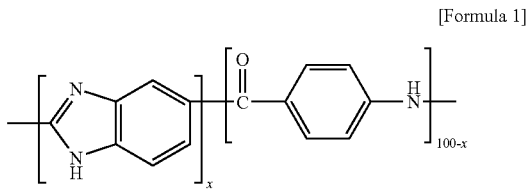

Wherein, x is 0.1~99.9.

The polybenzimidazole-benzamide copolymer is composed of the repeating units represented by formula 1 containing benzimidazole by 0.1%~99.9% and benzamide by 99.9%~0.1%. The copolymer of the present invention can be used as a polymer electrolyte membrane for a fuel cell. The copolymer is prepared by that diaminobenzoic acid, purified at 200° C.~250° C. in the presence of nitrogen, is dissolved in polyphosphoric acid and mixed with aminobenzoic acid, followed by stirring for more than 6 hours. At this time, the time point when aminobenzoic acid is added to the diaminobenzoic acid polymerization solution is regulated to guarantee mechanical properties of the copolymer.

The present invention also relates to a polymer electrolyte membrane for fuel cell prepared by using the copolymer of the invention and a preparation method thereof.

The polymer electrolyte membrane of the present invention is prepared by direct casting method that produces an electrolyte membrane directly from a polymerization solution. The method is elucidated hereinafter. Right after the polymerization of a copolymer composed of the repeating units represented by formula 1, the polymerization solution containing polyphosphoric acid is placed on a glass plate or a stainless plate, which stores in a 50~150° C. oven for 1 min ~3 days to let the solution dispersed widely. Doctor blade is used to regulate the thickness of the membrane produced. The formed membrane is cooled down to room temperature or under, which is then soaked in water to wash out polyphosphoric acid. The membrane is dried in 0.1 mmHg vacuum condition, resulting in a polymer membrane. The polymer membrane is doped in 6 M of phosphoric acid solution, followed by drying at 0.1 mmHg for 24~60 hours to prepare a polymer electrolyte membrane doped with phosphoric acid. The direct casting method does not require the purifying process and produces an electrolyte membrane having a proper thickness fast and easily. A modified method is also included in the rage of the present invention, that is, a polymer electrolyte membrane of the present invention can be prepared by doping with sulfuric acid or polyphosphoric acid instead of phosphoric acid.

The electrolyte membrane prepared by the above method has excellent mechanical properties and chemical and thermal stability, enabling the operating in wide temperature ranges from room temperature to 200° C. In addition, the electrolyte membrane of the invention shows high proton conductivity, compared with a polybenzimidazole electrolyte membrane, resulted from the introduction of benzamide into the conventional polybenzimidazole polymer.

The present invention further provides a membrane-electrode unit (MEA) for fuel cell prepared by using the polymer electrolyte membrane doped with acid and containing polybenzimidazole-benzamide copolymer of the invention and a fuel cell system including the unit.

BEST MODE FOR CARRYING OUT THE INVENTION

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLE 1

Synthesis of polybenzimidazole-benzamide [95-5 (Unit:Weight %)] Copolymer

In this example, aminobenzoic acid was copolymerized with diaminobenzoic acid having both amine group and carboxylic acid group together. At that time, diaminobenzoic acid and aminobenzoic acid were purified by recrystalization. 5 g of diaminobenzoic acid was dissolved in 100 mL of distilled water by heating. Upon completion of dissolving, the solution was cooled down at room temperature slowly, resulting in brown needle-like crystals. Aminobenzoic acid was purified with the same manner. The purified monomers were dried for 24 hours in vacuum condition and ready to be used.

95 g of polyphosphoric acid in a flask was heated at 220° C., to which 5 g of 5 wt % diaminobenzoic acid was added, followed by stirring. 10 minutes later, 0.25 g of 5 wt % aminobenzoic acid was added. As polymerization progressed, the solution turned into dark red solution with high viscosity. Upon completion of the reaction, the hot polymerization solution was placed on a glass plate and leveled, which was then put in an oven. The solution was stored in the oven at 100° C. for 2 days. A membrane having a regular thickness was formed on the glass plate. At that time, doctor blade was used to regulate the thickness of the film. The glass plate whereon 100 μm thick film was formed was soaked in 2 L of distilled water to wash out polyphosphoric acid. 4 L of distilled water was additionally used to eliminate the remaining polyphosphoric acid in the film at room temperature. For the complete elimination of polyphosphoric acid in the film, the film was soaked in distilled water again and heated for 3 days.

The prepared film was dried in vacuum condition at 1 mmHg for 48 hours. For doping of the dried film, the film was put in 6 M of phosphoric acid solution for 60 hours. The doped film was dried again at room temperature in vacuum condition at 1 mmHg.

EXAMPLE 2

Synthesis of polybenzimidazole-benzamide [90-10 (Unit:Weight %)] Copolymer

Copolymerization was performed by the same manner as described in Example 1 except that 0.5 g of aminobenzoic acid was used.

EXAMPLE 3

Synthesis of polybenzimidazole-benzamide [77-23 (Unit:Weight %)] Copolymer

Copolymerization was performed by the same manner as described in Example 1 except that 1.5 g of aminobenzoic acid was used.

EXPERIMENTAL EXAMPLE 1

Measurement of Proton Conductivity

Figure 1:
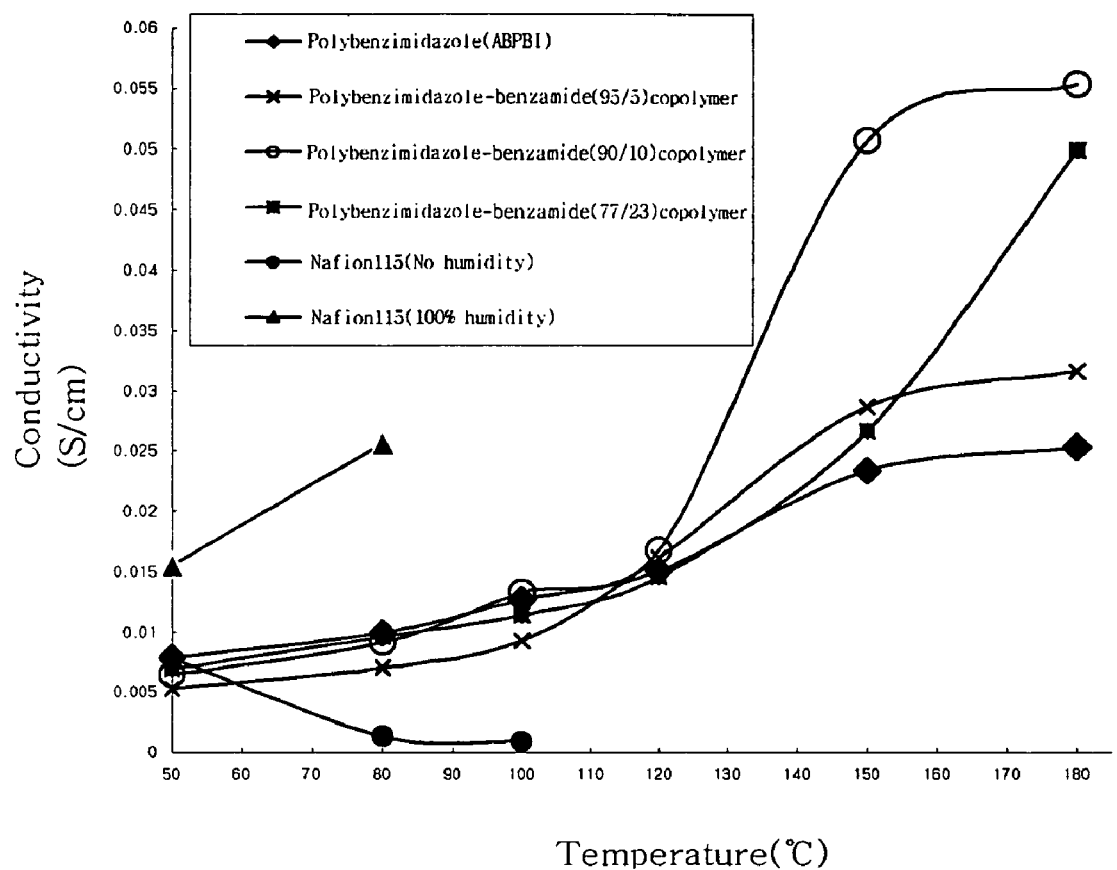
FIG. 1 is a photograph showing the temperature dependent proton conductivities of the polymer electrolyte membrane of the present invention and the conventional polymer electrolyte membrane.

Proton conductivity of the electrolyte membrane of the present invention was measured using ZAHNER IM-6 impedance analyzer in the frequency range of 1 Hz-1 MHz, at galvanostatic mode of 0.001-0.1 mA AC current amplitude, at the temperature range between room temperature to 180° C. and in the absence of humidity. In the case of Nafion 115, proton conductivity was measured twice, in the absence of humidity and in 100% humidity condition. The results are shown in FIG. 1.

EXPERIMENTAL EXAMPLE 2

Measurement of Viscosity

The viscosity of the electrolyte membrane of the present invention was measured by using Ubbelohde viscometer. Precisely, 1 g of the electrolyte membrane was dissolved with 98% sulfuric acid in a 50 mL flask, making the volume as 0.2 g/dL. Then, the viscosity was measured in a 30° C. thermostat. The results are shown in Table 1.

EXPERIMENTAL EXAMPLE 3

Measurement of Mechanical Strength

The mechanical strength of the electrolyte membrane of the present invention was measured with Lloyd LR-10K universal testing machine (UTM). Precisely, each electrolyte membrane was re-prepared as dog-bone film satisfying ASTM D638 type V at room temperature with 25% humidity. The mechanical strength was measured five times per each film. The mean values of tensile strength are shown in Table 1.

TABLE 1

| Copolymer | Tensile Strength (MPa) | Viscosity (dL/g) |
|---|---|---|
| Polybenzimidazole (ABPBI) | 99.34 | 3.76 |
| Polybenzimidazole-benzamide (95/5) copolymer | 64.87 | 1.78 |
| Polybenzimidazole-benzamide (90/10) copolymer | 114.59 | 3.22 |
| Polybenzimidazole-benzamide (77/23) copolymer | 101.84 | 2.36 |

EXPERIMENTAL EXAMPLE 4

Thermogravimetric Analysis (TGA)

Figure 2:
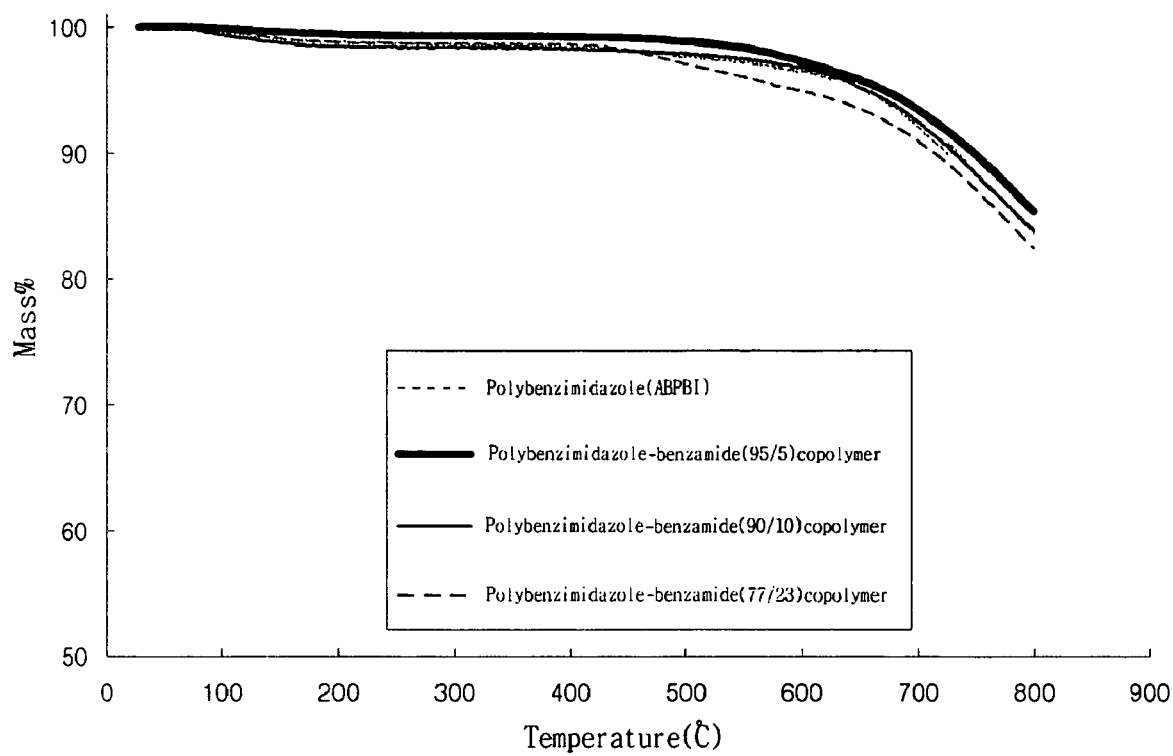
FIG. 2 is a photograph showing the thermal stabilities of the conventional polybenzimidazole polymer electrolyte membrane and the polymer electrolyte membrane of the present invention.

The thermal stability of the electrolyte membrane synthesized in the present invention was measured with TA instruments thermogravimetirc analyzer 2050. Precisely, 50 mg of each electrolyte membrane was heated from 50° C. to 800° C. by 10° C./min, during which the thermogravity was serially measured. And the results are shown in FIG. 2.

INDUSTRIAL APPLICABILITY

A polymer electrolyte membrane was prepared from polybenzimidazole-benzamide copolymer in the present invention. The polymer electrolyte membrane of the invention was proved to have as excellent mechanical properties as a polymer electrolyte membrane only composed of polybenzimidazole and at the same time shows high chemical and thermal stability (see Table 1 and FIG. 2). In addition, as shown in FIG. 1, the polymer electrolyte membrane of the invention has improved proton conductivity.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A polybenzimidazole-benzamide copolymer composed of the repeating units represented by the following formula 1

[Formula 1]

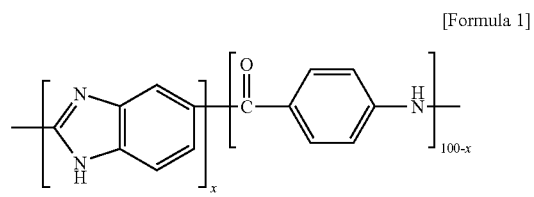

Wherein, x is 0.1~99.9.

2. A preparation method for the polybenzimidazole-benzamide copolymer of claim 1, which is characterized by preparing steps of dissolving diaminobenzoic acid purified in the presence of nitrogen at 200° C.~250° C. in polyphosphoric acid, mixing with aminobenzoic acid and stirring the mixture for more than 6 hours.

3. A polymer electrolyte membrane characteristically prepared from the copolymer of claim 1.

4. A preparation method for the polybenzimidazole-benzamide copolymer electrolyte membrane which is characterized by the steps of placing polymerization solution on a glass plate or a stainless plate right after the polymerization of the copolymer of claim 1 is completed, storing the plate for 1 minute~3 days in an oven at 50° C.~150° C. to form a film from the solution and eliminating polyphosphoric acid in the film.

5. The preparation method as set forth in claim 4, wherein additionally includes the step of hardening the film by quenching under room temperature prior to the step of eliminating polyphosphoric acid in the film.

6. The preparation method as set forth in claim 4, wherein additionally includes the step of doping of phosphoric acid, sulfuric acid or polyphosphoric acid after the elimination of polyphosphoric acid.

7. A membrane-electrode unit (MEA) which is prepared by using the polymer electrolyte membrane of claim 3.

8. A fuel cell system which characteristically contains the membrane-electrode unit of claim 7.

* * * * *